3,533,935
LIQUID ZONE ELECTROPHORESIS APPARATUS
Russell L. Steere, Hyattsville, and Robert E. Davis, Greenbelt, Md., assignors to the United States of America as represented by the Secretary of Agriculture
Filed Mar. 20, 1968, Ser. No. 714,631
Int. Cl. B01k 5/00; B01d 59/42
U.S. Cl. 204—299          7 Claims

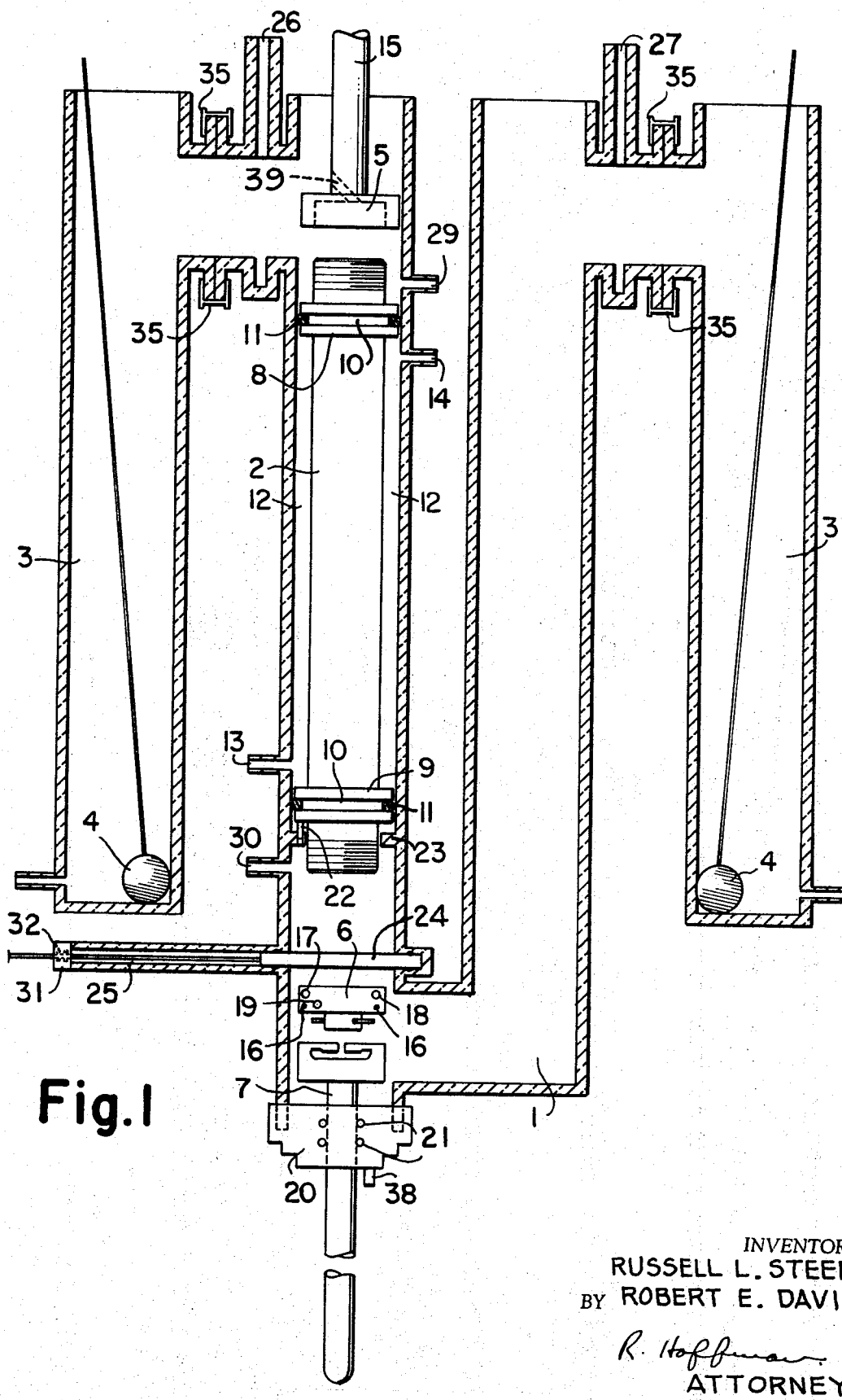

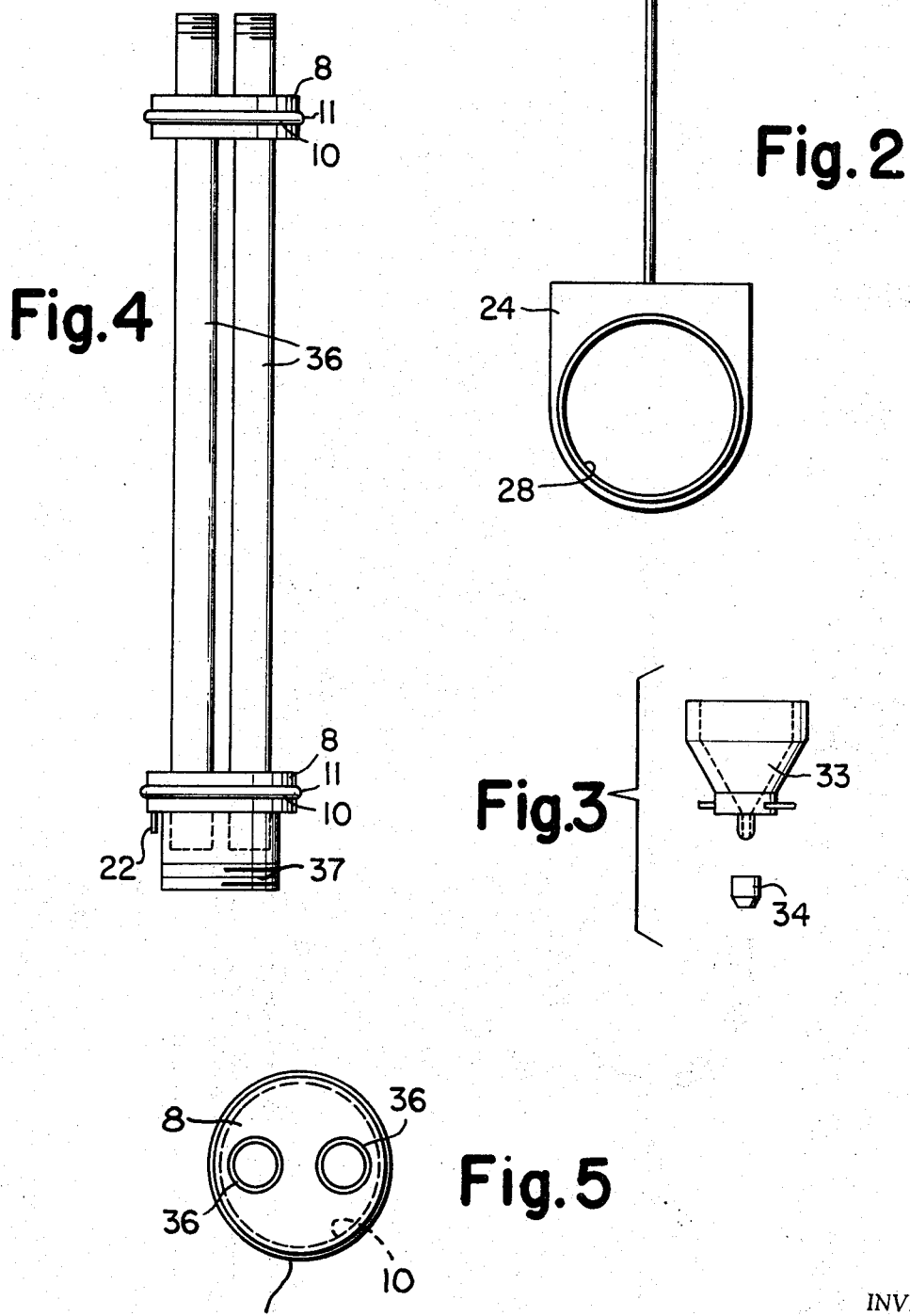

ABSTRACT OF THE DISCLOSURE

A liquid zone electrophoresis apparatus in which the liquid gradient is encapsulated, the capsule is self-contained and portable, and the column is prepared and layered with sample before the capsule is inserted into the U-tube. The capsule is threaded at both ends and provided with interchangeable covers so that the electrophoresed column can be sampled from either end. When inserted into an arm of a U-tube, gasketed collars near each end of the capsule form a jacket between the exterior wall of the capsule and the interior wall of the U-tube thus providing means for the circulation of temperature controlling fluid. Sliding panels partition the apparatus into sections and keep the U-tube fluids in place while replacing an electrophoresed column with one to be electrophoresed. Multi-chamber capsules provide means for simultaneously electrophoresing several samples.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to a novel apparatus for liquid zone electrophoresis and more specifically to an apparatus in which the gradient is encapsulated, thereby providing means for convenient and accurate preparation of the gradient column and introduction of the sample, rapid and precise continuous fractionation of the column after electrophoresis, electrophoresis is several columns simultaneously, convenient and rapid replacement of the electrophoresed columns, and nearly continuous operation.

Recent developments in electrophoretic techniques have emphasized gel electrophoresis and immunoelectrophoresis (Electrophoresis. Theory, Methods and Apparatus—H. G. Kunkel and R. Trautman, Academic Press, N.Y., p. 225, 1959) and paper curtain and liquid curtain electrophoresis (Z. Physiol Chem., 292, 32, 1953; Arkiu. Kemi 1, 37, 1949; Electrophoresis. Theory, Methods and Apparatus, H. G. Kunkel and R. Trautman, Academic Press, N.Y., pg. 179, 1959). Although instrumentation for, and advantages of, liquid-column zone electrophoresis for the separation of molecular, viral, and subcellular particle species have been well documented [Phytopathology 43, 467, 1953; Arch. Biochem. Biophys. 55, 175, 1954; Experientia 17, 49, 1961; a Laboratory Manual of Analytic Methods in Protein Chemistry, Including Polypeptides, Pergamon Press, 1, 193, 1960; Proc. First National Biophysics Conf., Yale University Press, p. 125, 1959; Virology 23, 495, 1964] the infrequent use of this technique is most probably due to the unavailability of a simple inexpensive instrument that combines reliability, versatility and ease of manipulation.

Prior to the development of the present invention, the liquid gradient was established and the electrophoresis done in a modified U-tube. Samples were removed by inserting a tube to the visible zones and drawing off the desired fraction or by drawing off fractions through a capillary tube mounted in the gradient system. This method of sampling is far from satisfactory when precise results are desired, because it is practically impossible not to disturb those parts of the column adjacent to the desired fraction. Thus the desired fraction is contaminated with other material drawn into the sampling tube.

The present invention provides a new apparatus for analytical and preparative liquid column zone electrophoresis that combines many desirable features, is inexpensive, is easily constructed, and allows accurate, continuous monitoring and sampling of electrophoresed columns. This invention also provides means for a number of important features such as the following:

(1) Preparation of the gradient column and precise insertion of the sample on the gradient column outside of the U-tube.
(2) Removal of the gradient column from the U-tube without disturbing the column.
(3) Continuous precise analysis of the fractions of the gradient column from top or bottom.
(4) Collection of fractions of any desired volume in any suitable fraction collector.
(5) Analysis of the collected fractions with a photometer or other instrument or by other means such as biological, biochemical or biophysical examination.
(6) Elimination of the need to drain the U-tube between successive runs when the same liquids are used outside the capsule. This allows continual use of the U-tube with easy, rapid insertion of another prepared capsule as soon as one is removed.
(7) Simultaneous electrophoresing of a sample and a control in a twin capsule. Also, whenever it is suspected that ultraviolet radiation might destroy infectivity or other activity of a sample, duplicate samples can be run—one through the UV recorder and the other into tubes for analysis of activity.
(8) Simultaneous electrophoresing of several samples or mixtures.
(9) Modification of the unit for experimental work such as increasing or decreasing the length or diameter of the capsule or incorporating a multiple capsule unit.
(10) Upgrading the unit for commercial use. This would not require any major modifications.
(11) Temperature control through use of the water jacket.
(12) Density gradient and pH gradient electrophoresis.

In addition, the development of the encapsulated gradient provides a system which can be routinely used in pH gradient or ionic strength gradient electrophoresis, isoelectric point determination, studies of interactions between particles during electrophoresis, concentration of solutes, and routine preparative separations of particle species.

One object of the present invention is to make liquid gradient zone electrophoresis a more useful tool for plant virus studies.

Another object is to provide a convenient and accurate means of preparing a gradient column and of inserting a sample in the column.

Still another object is to provide means for removing a gradient column from a U-tube without disturbing the column or the electrophoresed materials in the column.

A further object is to provide means for sampling a gradient column from either the top or the bottom of the column, means for continuously analyzing the sampled fractions photoelectrically or otherwise, and means for collecting the fractions.

A still further object is to provide means for electrophoresing two or more samples simultaneously.

An additional object is to provide an electrophoresis apparatus having interchangeable encapsulated liquid gradient columns.

Another additional object is to provide an electrophoresis apparatus that can easily be modified in size.

Still another additional object is to provide an electrophoresis apparatus in which the temperature of the gradient columns can be controlled.

One more object is to provide a system that can be routinely used in pH gradient or ionic strength gradient electrophoresis, isoelectric point determination, studies of interactions between particles during electrophoresis, concentration of solutes and preparative separations of particle species.

According to this invention, the foregoing objects are accomplished by a novel apparatus comprised essentially of a stationary, multi-armed U-shaped fluid receptacle means, a liquid gradient column encapsulating means, electrolyte receptacle means, electromotive force conducting means, cover means for aforesaid encapsulating means and cover turning means. The liquid gradient column encapsulating means is provided at each end with cover turning means for tightly securing and removing cover means. When the encapsulating means is in operating position in one arm of the stationary U-shaped fluid receptacle means, a gasketed flange-like ring or collar near each end of and encompassing the encapsulating means forms a fluid tight space between the inner wall of fluid receptacle means and the outer wall of the encapsulating means. Inlet and outlet ports to the fluid tight space provide means for circulating temperature controlling fluid around the exterior surface of the encapsulating means. One of the cover means is provided with multiple-orifice openings, at least two of which serve as means for equilibrating the gradient column with the contents of the fluid receptacle means and at least one of which serves as a means for introducing high density "chase" fluid. This cover means is used on either end of the encapsulating means depending on whether the electrophoresed column is to be fractionated from top to bottom or from bottom to top. In order to fractionate the column, a sampling cone is used in place a cover means and "chase" fluid is introduced through an orifice in the previously mentioned multi-orificed cover means, thus forcing the electrophoresed column through a capillary of the sampling cone. Another orificed cover means is provided with handling means for securing the cover means to the encapsulating means and for inserting the encapsulating means into and removing it from the fluid receptacle means. A cover turning means slidably mounted through a radial opening in the bottom of and extending coaxially with an arm of the fluid receptacle means is provided for removing from or securing to the bottom of the encapsulating means a cover or substitute thereof. Rotation of the encapsulating means while securing or removing one or more cover means is prevented by a stop means on the lower flange-like ring or collar. Rapid interchange of encapsulating means is accomplished without removing the fluid from the fluid receptacle means by the use of partitioning means provided near the bottom of the fluid receptacle means and between the fluid receptatcle means and the electrolyte receptacle means. Each electrolyte receptacle means is attached to the fluid receptacle meas by a fastening device and can easily be detached.

Referring now to the drawings:
FIG. 1 is a cross sectional view of the entire device.
FIG. 2 is a plan view of a sliding panel.
FIG. 3 is an exploded view of the sampling cone and sampling cone capillary tube cover.
FIG. 4 is an elevational view of the modified capsule.
FIG. 5 is a top plan view of FIG. 4.

The removable capsule liquid zone electrophoresis unit consists of the following major parts: Modified U-tube 1, capsule 2, electrode wells 3, electrodes 4, covers 5 and 6 and wrench mechanism 7. Capsule 2, shown in left arm of modified U-tube 1 (FIG. 1) is threaded at both ends and is fitted with collar 8 near the top and collar 9 near the bottom, each collar having a groove 10 for an O-ring gasket 11 thus forming space 12 between the outer wall of capsule 2 and the inner wall of the left arm of U-tube 1 when capsule 2 is in operating position. Inlet port 13 and exit port 14 provide means for circulation of temperature controlling fluid around the outside of capsule 2. Cover 5 is threaded and is equipped with handle 15 for inserting capsule 2 into and removing it from U-tube 1. Cover 6, threaded and equipped with a silicone O-ring or other suitable type seal 16, has three orifices 17, 18 and 19. When the system needs balancing orifices 17 and 18 serve as bleeder holes for equilibration of the gradient column in capsule 2 with the contents of the other arm of U-tube 1. High density "chase" fluid is introduced by insertion of a hypodermic needle, capillary tube or other similar small bore tube through orifice 19. Wrench mechanism 7 slidably mounted trough a radial opening in cover 20 and provided therein with sealing means 21 extends coaxially with an arm of U-tube 1 thus providing means for removing cover 6 or any substitute thereof from and replacing cover 6 or any substitute thereof on the bottom of capsule 2. Rotation of capsule 2 while removing and replacing covers 5 and 6 is prevented by fitting projection 22 on the underside of collar 9 into a female counterpart machined into U-tube stop collar 23. Rapid and convenient means of replacing an electrophoresed column with one to be electrophoresed is provided by a combination of three sliding panels 24 (FIG. 2) and apertures 25, 26 and 27. Each panel 24 having two O-ring or other type seals 28, one on each side of the panel, is slid into its respective aperture 25, 26 or 27, to partition the U-tube and hold the U-tube solutions in place, buffer above cover 5 is drained off through orifice 29, temperature controlling fluid is drained from space 12, and orifice 30 opened to allow passage of air as capsule 2 containing the electrophoresed column is removed and a new encapsulated column inserted into U-tube 1. No cover is needed at apertures 26 and 27 and panel 24 can be slid into place or withdrawn as desired.

At aperture 25, panel 24 is slidably mounted through a radial opening in cover 31 and provided therein with sealing means 32 through which the handle of panel 24 extends. In the operation of changing capsules the use of panel 24 at aperture 27 is optional because when panel 24 is slid into place in aperature 25 it will hold in place the solution beneath it and that in the right arm of U-tube 1. Fractionation from top to bottom of the electrophoresed column is accomplished by replacing cover 5 with sampling cone 33 (FIG. 3), introducing dense "chase" fluid through orifice 19, thus forcing the electrophoresed column to flow through the capillary of sampling cone 33 and through a capillary attached to that of sampling cone 33. For fractionating the column from bottom to top, sampling cone 33 is used in place of cover 6 on the bottom of capsule 2, cover 6 is used in place of cover 5 on top of capsule 2, and water is introduced through orifice 19 to force the gradient column through the capillary tube of sampling cone 33. If the column is being sampled from the bottom directly into a fraction collector, it is not necessary to attach a capillary to the sampling cone capillary. When the column is to be fractionated from bottom to top, sampling cone 33 is capped with capillary tube cover 34 during preparation of the gradient and during removal of capsule 2 from U-tube 1. The versatility of the electrophoresis unit is further enhanced by the detachability of the electrode wells 3 which allows them to be easily and rapidly replaced with wells containing fresh solutions. Each electrode well 3 is attached to U-tube 1 by a fastening device 35 which prevents leakage of fluid by exerting pressure on an O-ring or other sealing means. Multiple chamber capsules for electrophoresing simultaneously two or more samples or combination of sample(s) and control(s) are similar to the single chamber capsule except that they contain two or more tubular chambers 36 (FIGS. 4 and 5) having a common bottom enclosure 37 formed by placing cover 6 on the multi-chamber capsule. When sampling individual chambers of a multi-chambered capsule, a sampling cone similar to 33 but of appropriate size is placed on the chamber to be fractionated and appropriate sized covers are used to close the other chambers. A fractionized chamber from which a sampling cone is removed should be closed with a cover before the cover is removed from the next chamber to be fractionated. By using a sampling cone on each chamber all chambers can be fractionated simultaneously. Orifice 38 in cover 20 is provided for draining fluids from U-tube 1 and orifice 39 is provided as a bleeder hole in cover 5.

A general description of one mode of operation is herewith provided although it is understood that this mode of operation can be greatly deviated from and still be within the purview of this invention.

The liquid gradient column, with layered sample, is prepared in capsule 2 before placing the encapsulated column in U-tube 1. During this operation, cover 6 or a substitute thereof is secured on the bottom of capsule 2. Capsule 2 is filled to the top with desired buffer, closed with cover 5 or a substitute thereof and placed in the left arm of U-tube 1. Sliding panel 24 is withdrawn at aperture 25, air below the bottom of capsule 2 is allowed to escape through orifice 30 and the proper level of dense buffered liquid is placed in the right arm of U-tube 1. Buffer is layered on top of the dense liquid and on top of covered capsule 2. Each electrode 4 is covered with electrolyte solution and the sliding panels 24 at apertures 26 and 27 are withdrawn. Cover 5 or its substitute is then removed and the buffer in the two arms of U-tube 1 brought to the same level. Cover 6 or its substitute is slowly removed from capsule 2 by means of wrench 7 and withdrawn to a point below the bottom of the tube connecting the two arms of U-tube 1 and then the power supply is activated. After electrophoresis for the desired time, covers 6 and 5 on their substitutes are replaced in that order, the three sliding panels 24 are pushed into their respective apertures, 25, 26 and 27, to hold the solutions in place, buffer above cover 5 or its substitute is drained off through orifice 29 and the temperature controlling fluid is drained from space 12. With orifice 30 open, the electrophoresed column is then withdrawn from U-tube 1. For fractionating from top to bottom, cover 5 is replaced by sampling cone 33 and dense "chase" liquid is introduced through orifice 19 in cover 6. The electrophoresed column is thus lifted and forced to flow through the sampling cone capillary and through an external capillary tube attached to the sampling cone capillary. For fractionating from bottom to top, sampling cone 33 with its sampling cone capillary cover 34 is used in place of cover 6 and cover 6 is used in place of cover 5. Water is introduced through orifice 19 to drive the gradient downward. Fractions may be collected directly or the contents of the column may be passed continuously through a monitor and desired fractions sampled.

Although transparent materials such as glass, plexiglass, Teflon and various types of plastics are preferred, the apparatus can be made from any nonconductive material. It can also be designed to permit the use of one capsule in each arm of the U-tube. Another possibility is the use of a multi-armed U-shaped tube. The apparatus can easily be modified to allow fractionation and sampling of the gradient column without removing the capsule from the U-tube. The apparatus can be enlarged or reduced or varied in shape almost without limitation because the operating principles described for this invention are valid regardless of size. Rapid optical scanning without sampling can be accomplished by constructing the capsule with flat opetical glass or quartz. In addition, solid matrix columns can be handled with only a slight modification of the capsule.

The apparatus allows convenient electrophoresis in liquid columns. It permits preparation and sampling of columns outside of the U-tube and modification in size, shape, and number of column chambers. The gradient column can be sampled from top or bottom; the U-tube need not be drained, rinsed, and refilled between successive runs (particularly useful with large systems); capsules containing liquid gradients are interchangeable; and multiple chambered capsules allow UV monitoring (or other possibly destructive analyses) of one control gradient column with simultaneous sampling of remaining columns without their exposure to UV light or other harmful environment. These features, coupled with continuous scanning and sampling of electrophoresed columns, make the instrument useful in comparative and preparative studies with widely varying amounts of material. This new liquid-column zone electrophoresis apparatus combines ease of manipulation, versatility, and simplicity with precision in sampling, and makes density gradient electrophoresis a standard supplement to ultracentrifugation.

The inventors, using the described apparatus, have observed a heretofore unreported anomaly in the electrophoresis of a rod-shaped virus, that is, asymmetry of the migrating zone for rod-shaped tobacco mosaic virus (TMV) particles as contrasted with symmetrical zones for "spherical" virus particles.

We claim:

1. Apparatus for liquid zone electrophoresis comprising:
   (a) liquid gradient column encapsulating means, said means being portable and removable from the environment in which the encapsulated column is electrophoresed,
   (b) U-shaped fluid receptacle means provided with slidable partitioning means for rapid interchange of the aforesaid encapsulating means and further provided with means for circulating temperature controlling fluid around the exterior surface of the encapsulating means,
   (c) cover securing means at each end of said encapsulating means,
   (d) cover turning means slidably mounted through a radial opening in and extending coaxially with an arm of the aforesaid fluid receptacle means,
   (e) electrolyte receptacle means detachably secured to the U-shaped fluid receptacle means by a fastening device.

2. A liquid zone electrophoresis apparatus comprising:
   (a) a capsule threaded at both ends for receiving threaded covers and provided with a gasketed collar near each end, said capsule being portable and removable from a U-tube or other receptacle,
   (b) a U-tube removably containing said capsule, said U-tube having inlet and outlet ports for circulating temperature controlling fluid around the exterior of the aforesaid capsule, a cover at the bottom of one arm of the U-tube, said cover having a radial opening through which a slidably mounted wrench mechanism extends coaxially with said arm and said U-tube further provided with partitioning sliding panels for isolating said capsule,
   (c) electrode wells detachably fastened to the aforesaid U-tube and
   (d) electrodes in said wells.

3. The apparatus of claim 2 in which the capsule contains two chambers.

4. The apparatus of claim 2 in which the capsule is multichambered.

5. The apparatus of claim 2 having a threaded cover secured at one end of said capsule, said cover being provided with an orifice for introduction into said capsule of high density "chase" fluid.

6. The apparatus of claim 2 having a threaded cover secured at one end of said capsule, said cover being cone-shaped and provided with an internal capillary tube.

7. The apparatus of claim 2 having a threaded cover secured at one end of said capsule, said cover being provided with a handle for inserting said capsule into and removing it from said U-tube.

References Cited
UNITED STATES PATENTS

| | | | |
|---|---|---|---|
| 3,445,360 | 5/1969 | Via | 204—299 |
| 3,317,418 | 5/1967 | Zec | 204—299 |
| 3,384,564 | 5/1968 | Ornstein et al. | 204—180 |

JOHN H. MACK, Primary Examiner

N. A. KAPLAN, Assistant Examiner

U.S. Cl. X.R.

204—180